United States Patent
Kieffer

(10) Patent No.: US 7,412,644 B2
(45) Date of Patent: Aug. 12, 2008

(54) SYSTEM AND PROCESS FOR DELIVERING AND RENDERING SCALABLE WEB PAGES

(75) Inventor: Robert Kieffer, San Francisco, CA (US)

(73) Assignee: AOL LLC, a Delaware limited liability company, Dulles, VA (US)

( * ) Notice: Subject to any disclaimer, the term of this patent is extended or adjusted under 35 U.S.C. 154(b) by 420 days.

(21) Appl. No.: 10/203,044

(22) PCT Filed: Jan. 31, 2001

(86) PCT No.: PCT/US01/03128

§ 371 (c)(1),
(2), (4) Date: Aug. 23, 2003

(87) PCT Pub. No.: WO01/57718

PCT Pub. Date: Aug. 9, 2001

(65) Prior Publication Data

US 2004/0177327 A1    Sep. 9, 2004

(51) Int. Cl.
*G06F 15/00* (2006.01)
*G06F 7/00* (2006.01)
(52) U.S. Cl. .................. 715/200; 715/201; 715/234; 715/243; 715/273; 707/100
(58) Field of Classification Search ............... 715/517, 715/500.1, 524, 766, 800, 513, 526, 500; 707/100
See application file for complete search history.

(56) References Cited

U.S. PATENT DOCUMENTS

| | | | |
|---|---|---|---|
| 5,751,283 A | 5/1998 | Smith .................. 345/342 |
| 5,781,190 A * | 7/1998 | Gorbet et al. ............. 715/748 |
| 6,008,807 A | 12/1999 | Bretschneider et al. ..... 345/339 |
| 6,012,083 A * | 1/2000 | Savitzky et al. ........... 709/202 |
| 6,243,700 B1 * | 6/2001 | Zellweger ................. 707/3 |

(Continued)

OTHER PUBLICATIONS

Wood et al., Document Object Model (DOM) Level 1, Specification, Version 1, W3C Recommendation, Oct. 1, 1998, p. 1-3.*

(Continued)

*Primary Examiner*—Doug Hutton
*Assistant Examiner*—Chau Nguyen
(74) *Attorney, Agent, or Firm*—Michael A. Glenn; Glenn Patent Group

(57) ABSTRACT

A system and process for displaying and redisplaying an HTML document that conforms to the limitations of a viewer's browser. The system comprises a browser, a script, and a document object model (DOM). The script comprises a data structure and an interpretation code. The DOM is a document model representing a Web page's elements, such as text, images, URL links, etc. The process includes using the script to create a document data structure that describes the essential information in the document and using the interpretation code to interpret the data structure in a fashion that allows it to manipulate the DOM for the purpose of rendering the document in the browser. The data structure can be modified and the corresponding HTML can be subsequently regenerated in response to user events so that after initially being created, the document can be updated to reflect changes to the viewer's browser. if the viewer resizes the browser, the page elements can be automatically resized.

19 Claims, 2 Drawing Sheets

U.S. PATENT DOCUMENTS

| | | |
|---|---|---|
| 6,456,305 B1 * | 9/2002 | Qureshi et al. .............. 715/800 |
| 6,515,656 B1 * | 2/2003 | Wittenburg et al. ...... 715/501.1 |
| 6,718,515 B1 * | 4/2004 | Conner et al. ............... 715/509 |
| 6,748,569 B1 * | 6/2004 | Brooke et al. ............... 715/523 |
| 7,047,033 B2 * | 5/2006 | Wyler ...................... 455/552.1 |
| 2003/0208473 A1 * | 11/2003 | Lennon ........................ 707/3 |
| 2005/0132286 A1 * | 6/2005 | Rohrabaugh et al. ........ 715/523 |

OTHER PUBLICATIONS

Wood, Lauren, *Programming the Web: The W3C Dorn Specification*, 1999.

* cited by examiner

SYSTEM AND PROCESS FOR DELIVERING AND RENDERING SCALABLE WEB PAGES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office file or records, but otherwise reserves all copyright rights whatsoever.

BACKGROUND OF THE INVENTION

1. Technical Field

The invention relates generally to the Internet communication technology. More particularly, the invention relates to a system and method for delivering and rendering scalable Web pages.

2. Background of the Invention

Authors of World Wide Web (WWW) documents all share a common and frustrating problem: the viewers of their documents have highly diverse viewing environments—especially with regard to the physical dimensions of the window a document is displayed in. This is problematic, especially if authors desire to produce documents with specific layout requirements. Hypertext Markup Language (HTML), the document format for WWW, provides very little in the way of scalable page elements. Many elements, text in particular, are fixed at specific sizes. When viewed on browsers with a large display resolution, text appears quite small when compared to displays with low resolution. Furthermore, even those elements that support some form of scaling are difficult to control because of the rudimentary manner in which the scaling support is provided. All this makes development of a consistent layout for WWW documents rather difficult.

One way for a document author to combat this problem is through the use of dynamic scripting languages such as JavaScript. These languages provide a way to detect information about a viewer's environment and modify the document accordingly. Unfortunately, the native document object code (DOM) provided by these languages is rather problematic. In the case of Netscape Navigator 4, not all of the page elements are accessible. Many elements are "write-only" or "read-only", making it impossible to use the native structure as a reliable place to store document information.

Conversely, Internet Explorer (4 & 5) has a DOM that can be, at times, overly complex, making it difficult to constrain the degree to which a document should be modified.

Adding to the WWW author's problem is the fact that the DOMs used by Netscape Navigator and Internet Explorer are dramatically different in nature. Supporting both browsers requires the development of different scripts that can interact with the individual DOMs.

What is desired is to develop a browser independent document data structure which enable page authors to freely access and modify all relevant aspects of the document without having to worry about limitations of the browser DOMs.

SUMMARY OF THE INVENTION

The invention provides a system and process for displaying and redisplaying an HTML document that conforms to the limitations of a viewer's browser. The system comprises a browser, a script, and a document object model (DOM).

The script comprises a document data structure and an interpretation code. In the preferred embodiment of this invention, the document data structure is a slide presentation data structure designed for the system. The DOM is a document model representing a Web page's elements, such as text, images, URL links, etc.

Using this system, instead of creating an HTML document, a Web author creates his document that consists of the script. This script, when executed, creates a document data structure that describes the essential information in the document. The interpretation code interprets the data structure in a fashion that allows it to manipulate the DOM for the purpose of rendering the document in the browser.

By having the Web server provide the viewer's browser with a document data structure, instead of an HTML rendition of the document, the HTML for the document can be generated at a time when the browser information needed to create a properly sized document is available, thus allowing all features of the document to be sized accordingly. Furthermore, the data structure can be modified and the corresponding HTML can be subsequently regenerated in response to user events so that after initially being created, the document can be updated to reflect changes to the viewer's browser. For example, if the viewer resizes the browser, the page elements can be automatically resized.

By creating a browser independent data structure, the page author can freely access and modify all relevant aspects of the document without having to worry about limitations of browser DOMs. This browser independence also allows the author to develop a single script for interpreting the structure, rather than the two or more required for interpreting the different browser DOMs.

DETAILED DESCRIPTION OF THE INVENTION

Figure 1:
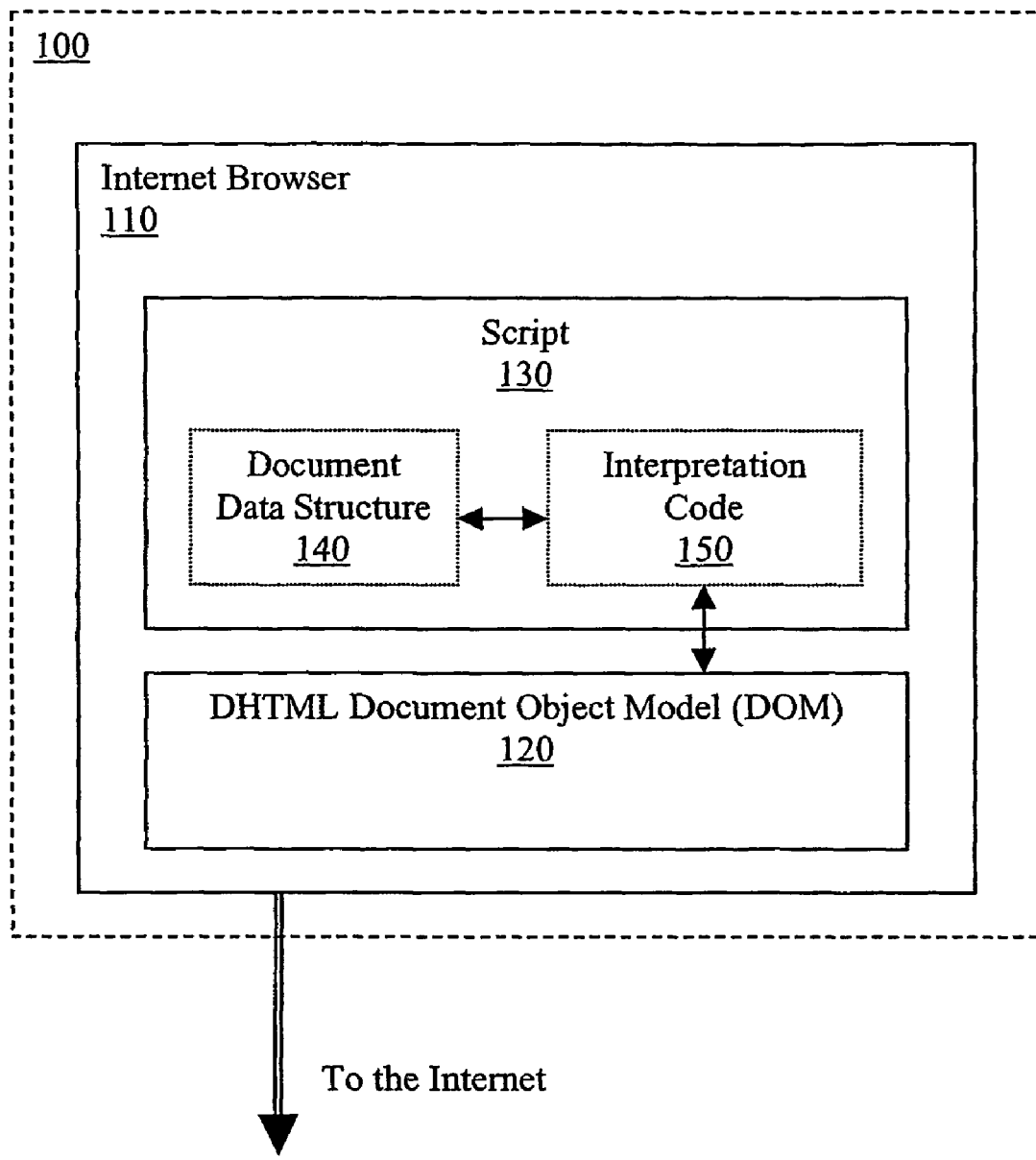
FIG. 1 is block diagram illustrating a system for displaying and redisplaying an HTML document that conforms to the limitations of a viewer's browser.

Referring to FIG. 1, a system 100 for displaying and redisplaying an HTML document that conforms to the limitations of a viewer's browser comprises a browser 110, a DHTML document object model (DOM) 120 and a script 130.

The browser 110 may be any kind of Web browser that supports a scripting language with some means of modifying the contents of displayed web pages (also known as the browser Document Object Model).

The DHTML DOM 120 is a document model representing a Web page's elements, such as text, images, URL links, and the like.

Figure 2:
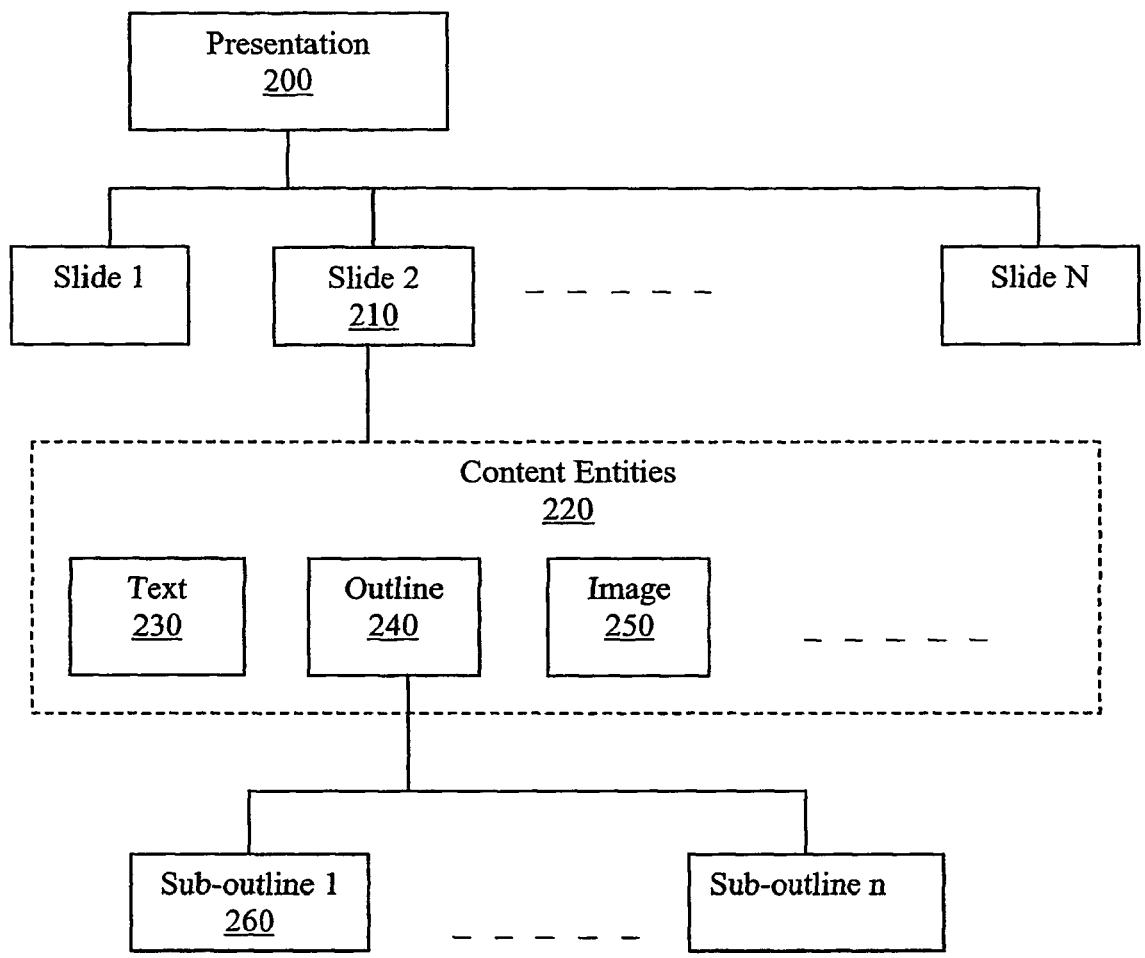
FIG. 2 is block diagram showing the hierarchical structure of a document data structure according to the invention.

The script 130 comprises a document data structure 140 and an interpretation code 150. The script is some combination of inline script (script included in the source HTML of a web page document) and script files referenced by the web page document. In the preferred embodiment of this invention, the document data structure 140 is a slide presentation data structure designed for this system. The hierarchical structure of said document data structure 140 is illustrated in FIG. 2 and Tables 1-8.

Using this system, instead of creating an HTML document, a Web author creates his document that consists of the script 130. This script, when executed, creates a document data structure 140 that describes the essential information in the document. The interpretation code 150 interprets the document data structure 140 in a fashion that allows it to manipulate the DHTML DOM 120 for the purpose of rendering the document in the browser.

The process to create a document data structure comprises the steps of:

1. Using a web server to respond to a viewer's browser's request for a document;
2. Retrieving or creating the content of the document in an appropriate fashion (Examples of this would be reading the document from a file on from a computer hard drive, querying a database for information, or using an algorithm to compute the content);
3. Translating the document content into a valid block of script code that, when executed by the viewer's browser, has the result of creating a data structure that can be accessed or manipulated;
4. Embedding the script code into the HTML document returned to the client; and
5. In the viewer's browser, executing the script block (this is typically automatically done by the browser).

Once the document data structure has been created, it can optionally perform any necessary data validation. This step, while not required, is frequently desirable to further format, validate, or optimize the data structure provided by the web server.

The Step 5 of the above process comprises the sub-steps of:
a. Setting the background color;
b. Creating a slide layer for presentation;
c. Enabling the display of said slide layer;
d. Initializing the address of said presentation and said slide;
e. Initializing various slide elements inside said slide;
f. Setting up the resize handler, and
g. Rendering said slide into HTML and displaying said presentation in said browser.

When the slide elements are text entities, the sub-step (e) of the above process comprises of the sub-sub-steps:
(aa) Setting up address for said text entities;
(ab) Creating a layer for said text entities; and
(ac) Enabling the display of said layer.

When said slide elements are image entities, the sub-step (e) comprises the sub-sub-steps:
(ba) Setting up address for said image entities;
(bb) Creating a layer for said image entities; and
(bc) Enabling the display of said layer.

When said slide elements are outline entities, the sub-step (e) comprises the sub-sub-steps:
(ca) Setting up address for said outline entities; and
(cb) Initializing outline nodes for said outline entities.

The sub-step (g) of the above process comprises sub-sub-steps of:
(da) Getting the client screen sizes;
(db) Setting the clipping region of said slide layer;
(dc) Rendering various slide elements inside said slide; and
(de) Flushing the output to said layer.

In the sub-step (g), when slide elements are text entities, the sub-sub-step (dc) comprises of the sub-sub-sub-steps:
(a1) Setting layer color and alignment;
(a2) Generating the text to be displayed;
(a3) Writing the URL start tag;
(a4) Writing the style and said text; and
(a5) Writing the URL end tag.

In the sub-step (g), when slide elements are image entities, the sub-sub-step (dc) comprises of the sub-sub-sub-steps:
(b1) Setting layer background color;
(b2) Wring empty content string if slide is editable;
(b3) Getting the URL of image source;
(b4) Writing the URL start tag;
(b5) Rendering said image; and
(b6) Writing the URL end tag.

In the sub-step (g), when slide elements are outline entities, the sub-sub-step (dc) comprises of the sub-sub-sub-steps:
(c1) Setting up default properties;
(c2) Creating and initializing a rendering context;
(c3) Setting origin and available width;
(c4) Rendering outline nodes with said rendering context; and
(c5) Hiding unused layers.

The process to interpret the document data structure comprises the steps of:

1. Identifying objects in the document data structure, which is served up by the web server, that need to be rendered in the viewer's browser;
2. Locating or creating the elements of the browser DOM that are used for rendering the document;
3. Applying any transformations or other changes needed to accommodate the viewer's specific browser configuration to the DOM element or the document data structure;
4. Generating HTML needed to render said objects; and
5. Applying that HTML into the DOM elements, causing it to be displayed in the browser.

The Step 3 of the above process comprises the sub-steps of:
a. Setting the background color;
b. Creating a slide layer for presentation;
c. Enabling the display of said slide layer;
d. Initializing the address of said presentation and said slide;
e. Initializing various slide elements inside said slide; and
f. Setting up the resize handler.

When the slide elements are text entities, the sub-step (e) of the above process comprises of the sub-sub-steps:
(aa) Setting up address for said text entities;
(ab) Creating a layer for said text entities; and
(ac) Enabling the display of said layer.

When said slide elements are image entities, the sub-step (e) comprises the sub-sub-steps:
(ba) Setting up address for said image entities;
(bb) Creating a layer for said image entities; and
(bc) Enabling the display of said layer.

When said slide elements are outline entities, the sub-step (e) comprises the sub-sub-steps:
(ca) Setting up address for said outline entities; and
(cb) Initializing outline nodes for said outline entities.

The Step 4 of the above process comprises the sub-steps of:
(da) Getting the client screen sizes;
(db) Setting the clipping region of said slide layer;
(dc) Rendering various slide elements inside said slide; and
(de) Flushing the output to said layer.

When slide elements are text entities, the sub-step (dc) under Step 4 comprises of the sub-sub-steps:
(a1) Setting layer color and alignment;
(a2) Generating the text to be displayed;
(a3) Writing the URL start tag;
(a4) Writing the style and said text; and
(a5) Writing the URL end tag.

When slide elements are image entities, the sub-step (dc) under Step 4 comprises of the sub-sub-steps:
(b1) Setting layer background color;
(b2) Wring empty content string if slide is editable;
(b3) Getting the URL of image source;
(b4) Writing the URL start tag;
(b5) Rendering said image; and
(b6) Writing the URL end tag.

When slide elements are outline entities, the sub-step (dc) under Step 4 comprises of the sub-sub-steps:
(c1) Setting up default properties;
(c2) Creating and initializing a rendering context;
(c3) Setting origin and available width;
(c4) Rendering outline nodes with said rendering context, and
(c5) Hiding unused layers.

By having the Web server provide the viewer's browser with a document data structure—a data structure that describes a document, instead of an HTML rendition of the document, the HTML for the document can be generated at a time when the browser information needed to create a properly sized document is available, thus allowing all features of the document to be sized accordingly. Furthermore, the data structure can be modified (and the corresponding HTML subsequently regenerated) in response to user events so that after initially being created, the document can be updated to reflect changes to the viewer's browser. For example, if the viewer resizes the browser, the page elements can be automatically resized.

Therefore, by creating a browser independent data structure, the page author can freely access and modify all relevant aspects of the document without having to worry about limitations of browser DOMs. This browser independence also allows the author to develop a single script for interpreting the structure, rather than the two (or more) required for interpreting the different browser DOMs.

A side benefit of this is that author-defined data structure can be optimized to include only the most essential information. This makes them much smaller than the equivalent HTML, which may help transmission times, especially over low bandwidth communication lines.

The document data structure and the interpretation code may be contained in a single file. This makes transport and portability easier, but requires the interpretation code be sent with each document.

The distinction between the document data structure and the interpretation code is essentially one of state vs. behavior. The document data represents the state needed to display a document, with little or no associated behavior.

The interpretation code provides the behavior needed for understanding a document data structure and creating an HTML representation of it. The interpretation code may be separated out from the document data structure code. This is expected to be the more attractive solution since it allows browsers to cache the interpretation code for later use on another, similar document.

FIG. 2 is a block diagram which shows a hierarchical structure of the document data structure 140. The first layer is SXPresentation 200, which is the root object of the presentation data structure. It contains an array of SXSlides which are at the second layer.

SXSlide 210 is an object representing a single slide in a presentation. It contains any number of SXContentEntities 220 which are at the third layer.

SXContentEntity 220 is an abstract representation for one of a number of different types of slide elements. These types include: SXText 230, SXOutline 240 and SXImage 250.

The SXOutline 240 may, in turn, contain other sub-outlines 260.

Each of these entities in the presentation data structure has a variety of properties associated with it, which are described in the following tables.

This system supports a limited token replacement functionality. Table 1 contains (1) the recognized tokens, (2) the scope in which replacement occurs, and (3) the value with which they are replaced.

TABLE 1

Token Replacement

| Token | Scope | Value |
| --- | --- | --- |
| % SlideNumber % | SlideNumber (SXText) | The index of the current slide (starting with '1'). |
| % SlideCount % | SlideNumber (SXText) | The total number of slides in the presentation. |

Additional tokens should use the '% TokenName %' notation.

Token replacement is done using an exact string match method—only text that exactly matches the token, including the surrounding '%' characters will be replaced. However, there is currently no way to escape the '%' character so, for example, there is no way to have the string '% SlideNumber %' appear in a SlideNumber element.

Table 2 through Table 8 list a type for the different properties. This type describes the semantic type of the object, not necessarily the data type, e.g. the zindex property, which is listed as being of type "integer", is contained in a string data type. The type fields are listed in Table 2.

TABLE 2

Type Fields

| | |
| --- | --- |
| string | A value containing any valid alpha-numeric characters. In javascript, the '/' and '\n' characters should be escaped. |
| integer | An integer value (e.g. '1234' or '−1234') |
| float | A floating point value (e.g. '1.234' or '−1.234'). Typically exponential notation is not used (and is not guaranteed to be supported). |
| color | An HTML style color value. This can be a color name, but is more often the color code in '#RRGGBB' notation. |
| array | An ordered collection of objects |
| hashmap | A mapped collection of objects |

TABLE 3

SXPresentation

| Attribute | Type | Description |
| --- | --- | --- |
| currentSlideIndex | Integer | The index of the current slide in the presentation. This is the true index of the slide in the presentation. |
| isSample | Boolean | This is true for sample presentations |
| isStyle | Boolean | This is true for style presentations |
| isTemplate | Boolean | This is true for template presentations |
| presentationID | Integer | The database id of the presentation |
| slideCount | Integer | The total number of slides in the presentation. |
| slides | Array | The array of slides that make up the presentation. Note: This array is not guaranteed to be completely populated by all the slides in a presentation. Typically it will contain only a single object (at index 0). The true index of the slide can be found in the currentSlideIndex property. |
| slideTitles | Array | An array of strings that contain the titles of each slide in the presentation. The title of the current slide can be |

TABLE 3-continued

SXPresentation

| Attribute | Type | Description |
|---|---|---|
| type | String | found in slideTitles [currentSlideIndex]<br>Value:<br>com.iamaze.presentation.SXPresentation |

TABLE 4

SXSlide

| Attribute | Type | Description |
|---|---|---|
| contentEntities | Hashmap | The set of SXContentEntities that comprise the slide content |
| effect | String | The type of effect to use when showing the slide.<br>Values:<br>swoosh-left: Slide elements slide in from the right<br>swoosh-right: Slide elements slide in from the left<br>swoosh-up: Slide elements slide in from the bottom<br>swoosh-down: Slide elements slide in from the top<br>flash: Slide elements "flash" briefly. (Currently only the title and outline elements exhibit this effect)<br>build: Slide elements reveal progressively on each mouse click. (Currently only outline elements are revealed in this way - one top level element per click.) |
| layoutName | string | The name of the layout this presentation is based on. |
| notes | string | User supplied notes for the slide (Currently not used for anything interesting.) |
| title | string | The title of the slide. |
| type | string | Value: com.iamaze.presentation.SXSlide |

TABLE 5

Abstract SXContentEntity

| Attribute | Type | Description |
|---|---|---|
| top | string | These values define the rect occupied by the entity |
| left | string | |
| width | string | |
| height | string | |
| type | string | The type of the object - this is actually the complete java path name of the SXPersistentContentEntity subclass that is responsible for storing the entity<br>Values:<br>com.iamaze.presentation.contenttype.SXText<br>com.iamaze.presentation.contenttype.SXOutline<br>com.iamaze.presentation.contenttype.SXImage |
| name | string | The name of the element<br>Values: The name Background is reserved for the background element of the slide. |
| zIndex | integer | The z-ordering of the layer elements in the slide. The Background element is always at index 0 (the bottom). |

TABLE 6

SXText which inherits all the attributes of Abstract SXContentEntity

| Attribute | Type | Description |
|---|---|---|
| fontSize | integer | Font point size |
| color | color | Text color |
| backgroundColor | color | Background color |
| fontFamily | string | Font family |
| fontWeight | string | Font weight<br>Values: bold |
| align | string | Horizontal alignment<br>Values: left, center, right |
| text | string | Content of the entity |
| verticalAlign | string | Vertical alignment<br>Values: top, middle, bottom |
| url | string | URL to navigate to when clicked on during playback<br>Note: If no preceeding '/' or protocol (e.g. "http://", "http://" is prepended.) |
| fontStyle | string | Font style<br>Values: italic |

TABLE 7

SXOutline Entity which inherits all the attributes of SXText

| Attribute | Type | Description |
|---|---|---|
| align | string | Ignored in SXOutline entities |
| verticalAlign | string | Ignored in SXOutline entities |
| nodeBulletType | string | Type of bullet<br>Values: text-symbol, text-letter-lower, text-letter-upper, text-number-plain, text-number-nested, text-roman-lower, text-roman-upper, image<br>Note: The image and text-number-nested types are deprecated (Uwe, you don't need to support these types) |
| nodeBulletValue | string | The value specifying how the bullet should look. This is interpreted differently depending on the type specified in nodeBulletType, as follows:<br>text-symbol: The value is the decimal value of the Unicode character to display. A null value here is an error.<br>text-letter-lower/upper, text-number-plain/nested, and text-roman-lower/upper: The value is the index into the respective sequence. The values 0, 1, 2 correspond to the following (with subsequent values following logically)<br>text-letter-lower/upper:<br>a, b, c/A, B, C<br>text-number-plain/nested:<br>1, 2, 3/(deprecated)<br>text-roman-lower/upper:<br>i, ii, iii/I, II, III<br>Note that these are sequential bullets. If no value is specified, they will automatically use the previous index + 1. If the bullet is the first bullet in the nodes array, it's index defaults to 0. |
| nodes | array | Array of SXOutlines that are the children of this outline |

TABLE 8

SXImage which inherits all the attributes
of Abstract SXContentEntity

| Attribute | Type | Description |
| --- | --- | --- |
| align | string | Horizontal alignment<br>Values: left, center, right |
| backgroundColor | color | |
| scale | string | The scaling mode to use when displaying the image<br>Values:<br>fit: The image is scaled to fit exactly within the bounds<br>width: The image is scaled, retaining the aspect ratio, so the width of the image fits exactly in the bounds.<br>height: The image is scaled, retaining the aspect ratio, so the height of the image fits exactly in the bounds.<br>tile: The image is tiled at it's native size to exactly fill the image bounds. (The tiling origin is in the upper left corner.)<br>Note: For width and height scaling, the image is not clipped in the event it overflows the image bounds. |
| src | string | The URL of the image to display in this entity |
| url | string | URL to navigate to when clicked on during playback<br>Note: If no preceeding '/' or protocol (e.g. "http://", "http://" is prepended.) |
| verticalAlign | string | Vertical alignment<br>Values: top, middle, bottom |

In this system a SXImage entity that has the name "Background" is treated specially. This content entity describes the background of a slide and is treated in the following ways:

Its bounds always correspond exactly to the bounds of the slide.

Its z-index is always set to zero (0).

Table 9 is a fragment of JavaScript illustrating what a document data structure looks like. In this sample, the document is a slide from a presentation document. Table 10 is a JavaScript that interprets the data structure for the slide. Table 11 is a JavaScript that interprets the data structure for an outline. Table 12 is the Java source code used by the web server to convert an arbitrary hashmap (as retrieved from a database) into a JavaScript data structure in the viewer's browser.

Table 9. JavaScript for a slide from a presentation document

```
var presentation = {
    type:'com.iamaze.presentation.SXPresentation',
    isStyle:false,
    presentationID:'com.iamaze.presentation.SXPresentation_931181',
    isTemplate:false,
    currentSlideIndex:'5',
    slideCount:'7',
    slides:[
       {
            contentEntities:{
              Subtitle1:{
              fontSize:'28',
              top:'13%',
              width:'60%',
              color:'FF9933',
              backgroundColor:null,
              fontFamily:null,
              fontWeight:null,
              height:'6%',
              align:'center',
              text:'As anywhere, street vendors abound',
              verticalAlign:'top',
              url:null,
              fontStyle:'italic',
              left:'37%',
              zIndex:'6',
              type:'com.iamaze.presentation.contenttype.SXText',
              name:'Subtitle1'
              },
              Outline1:{
                   fontSize:null,
                   top:'20%',
                   width:'36%',
                   color:null,
                   backgroundColor:null,
                   fontFamily:null,
                   fontWeight:null,
                   height:'66%',
                   align:null,
                   nodeBulletType:null,
                   text:null,
                   verticalAlign:null,
                   url:null,
                   fontStyle:null,
                   nodeBulletValue:null,
```

```
                nodes:[
                    {
                        fontSize:'28',
                        top:null,
                        width:null,
                        color:'333300',
                        backgroundColor:null,
                        fontFamily:'Georgia, Times New Roman, Times,
serif',
                        fontWeight:null,
                        height:null,
                        align:null,
                        nodeBulletType:'text-symbol',
                        text:'The Island of Nax',
                        verticalAlign:null,
                        url:null,
                        fontStyle:null,
                        nodeBulletValue:'8226',
                        nodes:null,
                        left:null,
                        zIndex:null,
type:'com.iamaze.presentation.contenttype.SXOutline',
                        name:null
                    },
                    {
                        fontSize:'28',
                        top:null,
                        width:null,
                        color:'333300',
                        backgroundColor:null,
                        fontFamily:'Georgia, Times New Roman, Times,
serif',
                        fontWeight:null,
                        height:null,
                        align:null,
                        nodeBulletType:'text-symbol',
                        text:'When in the Islands, seafood is a must.
You can\'t find any fresher or more delicious octopus anywhere.',
                        verticalAlign:null,
                        url:null,
                        fontStyle:null,
                        nodeBulletValue:'8226',
                        nodes:null,
                        left:null,
                        zIndex:null,
type:'com.iamaze.presentation.contenttype.SXOutline',
                        name:null
                    }
                ],
                left:'50%',
                zIndex:'7',
                type:'com.iamaze.presentation.contenttype.SXOutline',
                name:'Outline1'
            },
            StyleImage1:{
                scale:null,
                top:'0',
                width:'3%',
                backgroundColor:'9966CC',
```

```
            height:'100%',
            align:'center',
            verticalAlign:'middle',
            url:null,
            src:null,
            left:'0',
            zIndex:'7',
            type:'com.iamaze.presentation.contenttype.SXImage',
            name:'StyleImage1'
        },
        Title1:{
            fontSize:'27',
            top:'5%',
            width:'90%',
            color:'333300',
            backgroundColor:null,
            fontFamily:'Georgia, Times New Roman, Times, serif',
            fontWeight:'bold',
            height:'10%',
            align:'center',
            text:'Octopii Vendors',
            verticalAlign:'center',
            url:null,
            fontStyle:null,
            left:'5%',
            zIndex:'6',
            type:'com.iamaze.presentation.contenttype.SXText',
            name:'Title1'
        },
        Background:{
            scale:'fit',
            top:null,
            width:null,
            backgroundColor:null,
            height:null,
            align:'center',
            verticalAlign:'middle',
            url:null,
            src:'/images/backgrounds-large/Waterlilies-
1024x768_7.jpg',
            left:null,
            zIndex:'1',
            type:'com.iamaze.presentation.contenttype.SXImage',
            name:'Background'
        },
        Image1:{
            scale:'width',
            top:'20%',
            width:'36%',
            backgroundColor:null,
            height:'66%',
            align:'right',
            verticalAlign:'top',
            url:null,
            src:'/images/samples/NaxOctopi.jpg',
            left:'10%',
            zIndex:'8',
            type:'com.iamaze.presentation.contenttype.SXImage',
            name:'Image1'
        }
    },
```

```
            effect:null,
            layoutName:'1Outline+1Image-2',
            notes:null,
            title:'Octopii Vendors',
            _old_contentEntities:null,
            type:'com.iamaze.presentation.SXSlide'
        }
    ],
    slideTitles:[
        '<Travel Destination goes here>',
        '<A Title for Photos Below>',
        '<Add a Title for the Images>',
        '<Third Destination Goes Here>',
        'The Whitewashes of Greece',
        'Octopii Vendors',
        'Next stop, Indonesia!\n\n\'Til then...\n-Rosie'
    ],
    isSample:false
};
```

Table 10. JavaScript that interprets the data structure for a slide

```
function CXSlide() {};

CXSlide.version = 1;
CXSlide.name = 'Slide';

CXSystem.registerLibrary(CXSlide);
/************************/
//
// Global vars
//

// The last width and height of the window (only used on NS4)
var lastWidth=0, lastHeight=0;

// Flag for turning DOM validation on and off
var DEBUG_DOM = false;
debugRegisterFlag('DEBUG_DOM');

// Error string
var WARNING_NO_SLIDE_LAYER = 'Unable to locate the slide layer. A
temporary one will be created but the quality of this page will be
degraded.';

// The name of the layer that contains the slide
var SLIDE_NAME = 'Slide';

// The name of the layer that contains the background
var BACKGROUND_NAME = 'Background';

// The virtual width, height, and diagonal of the slide
var V_WIDTH = 1024;
var V_HEIGHT = 768;
var V_DIAG = Math.sqrt(V_WIDTH*V_WIDTH + V_HEIGHT*V_HEIGHT);
```

```
// Default strings to show
var DEFAULT_DIRECTIONS = (ie4) ? 'Double click' : 'Click here and
choose "Properties"';
var DEFAULT_TEXT_STRING = 'to edit';
var DEFAULT_IMAGE_STRING = 'to specify image';

// Types of content elements
var CLASS_PACKAGE = 'com.iamaze.presentation';
var PRESENTATION_CLASS = CLASS_PACKAGE + '.SXPresentation';
var SLIDE_CLASS = CLASS_PACKAGE + '.SXSlide';
var TEXT_CLASS = CLASS_PACKAGE + '.contenttype.SXText';
var IMAGE_CLASS = CLASS_PACKAGE + '.contenttype.SXImage';
var OUTLINE_CLASS = CLASS_PACKAGE + '.contenttype.SXOutline';

// Constants for the 'scale' field of image entities
var SCALE_NONE = null;
var SCALE_FIT = 'fit';
var SCALE_WIDTH = 'width';
var SCALE_HEIGHT = 'height';
var SCALE_TILE = 'tile';

// The path to the shim image
var SHIM_IMAGE = '/html/images/shim.gif';

// Define and set variable indicating whether or not the slide can be
edited
var slideIsEditable = false;

// The layer containing the slide
var slideLayer = null;

// Flag indicating whether or not this is the first rendition of the
page
var slideIsRendered = false;

// The width of the client document area
var clientWidth = V_WIDTH;
var clientHeight = V_HEIGHT;

// A prefix we use to uniquely name our images
var IMAGE_NAME_PREFIX = "iamaze"

// The scale factors we use to resize the slide
var xScale=1.0;
var yScale=1.0;
var scale=1.0;

// PENDING(RWK) - Quick patch to get the new data structure working
var slide = presentation.slides[0];
var slideContent = slide.contentEntities;

var resizeTimeout = null;
var slideResizeInterval = null;

/*
 * Called during document.onload()
 */
CXSlide.onload = function() {
    if (ns4 || !isRenderingEnabled()) setShowingBatched(true);
    // Set the background color if we're not editing
```

```
    if (!slideIsEditable &&
        slide.contentEntities.Background.backgroundColor) {
        document.bgColor =
slide.contentEntities.Background.backgroundColor;
    }

// Get the layer containing the slide
    slideLayer = getNamedLayer(SLIDE_NAME);
    if (slideLayer == null) {
      warning(WARNING_NO_SLIDE_LAYER);
      slideLayer = newNamedLayer(SLIDE_NAME, null);
      slideLayer.setSize(640, 480);
      slideLayer.setOrigin(200,150);
    }
    slideLayer.show();

// Initialize the presentation & slide address
    presentation._address = presentation.presentationID;
    setupEntity(presentation.slides[0], 'Slide', SLIDE_CLASS,
presentation);
//    slideCacheAddress();

// Init the various slide elements
    for (var myName in slideContent) {
      var myContent = slideContent[myName];
        setupEntity(myContent, myName, myContent.type, slide);
    }

// Mark the last known width and height for NS resize bug
workaround
    // (See comments in slideResize() for more details)
    if (ns4) {
      lastWidth = window.innerWidth;
      lastHeight = window.innerHeight;
    }

// Set up the resize handler
    if (!ns4 || !slideIsEditable) {
      window.onresize = slideResize;
    } else {
      // PENDING(RWK) - NS4 workaround: In NS4.5/4.7, the resize
event
      // doesn't appear to be getting sent in the edit slide page.
We've
      // been unable to pin this down to anything more than the page
just
      // being pretty complex (layer-wise).  To work around this, we
set
      // up a timer that to call the resize handler every second or
so.
      // This works because, on Netscape, this handler only does
      // something if the window actually changes size.
      slideResizeInterval = setInterval('slideResize();', 1000);
    }

// Render the slides
    render();
    if (ns4) setShowingBatched(false);
    slideIsRendered = true;
}
```

```
/*
 * The Document Type Definition we use to do some checking of the DOM
integrity
 *
 * The fields are:
 *     attributeName, datatype, required/optional, defaultvalue
 *
 * the defaultValue may be left out, in which case null is used
 */
var dtd = {
    SXPresentation:[
        ['currentSlideIndex', 'number', 'required'],
        ['presentationID',    'string', 'required'],
        ['slideCount',        'number', 'required'],
        ['slides',            'object', 'required'],
        ['slideTitles',       'object', 'required']
    ],
    SXSlide:[
        ['title',           'string', 'optional'],
        ['layoutName',      'string', 'optional'],
        ['contentEntities', 'object', 'required'],
        ['notes',           'string', 'optional']
    ],
    SXImage:[
        ['align',           'string', 'optional'],
        ['backgroundColor', 'color',  'optional'],
        ['height',          'string', 'optional'],
        ['left',            'string', 'optional'],
        ['scale',           'string', 'optional'],
        ['src',             'string', 'optional'],
        ['top',             'string', 'optional'],
        ['verticalAlign',   'string', 'optional'],
        ['width',           'string', 'optional'],
        ['zIndex',          'number', 'optional']
    ],
    SXText:[
        ['align',           'string', 'optional'],
        ['backgroundColor', 'color',  'optional'],
        ['color',           'color',  'optional'],
        ['fontFamily',      'string', 'optional'],
        ['fontSize',        'number', 'optional'],
        ['fontStyle',       'string', 'optional'],
        ['fontWeight',      'string', 'optional'],
        ['height',          'string', 'optional'],
        ['left',            'string', 'optional'],
        ['text',            'string', 'optional'],
        ['top',             'string', 'optional'],
        ['url',             'string', 'optional'],
        ['verticalAlign',   'string', 'optional'],
        ['width',           'string', 'optional'],
        ['zIndex',          'number', 'optional']
    ],
    SXOutline:[
        ['align',           'string', 'optional'],
        ['backgroundColor', 'color',  'optional'],
        ['color',           'color',  'optional'],
        ['fontFamily',      'string', 'optional'],
        ['fontSize',        'number', 'optional'],
        ['fontStyle',       'string', 'optional'],
        ['fontWeight',      'string', 'optional'],
```

```
        ['height',         'string',    'optional'],
        ['left',           'string',    'optional'],
        ['nodeBulletType', 'string',    'optional'],
        ['nodeBulletValue','any',       'optional'],
        ['nodes',          'object',    'optional'],
        ['text',           'string',    'optional'],
        ['top',            'string',    'optional'],
        ['url',            'string',    'optional'],
        ['verticalAlign',  'string',    'optional'],
        ['width',          'string',    'optional'],
        ['zIndex',         'number',    'optional']
    ]
};

// Run the dom check
setStatus('Validating DOM');
if (presentation.currentSlideIndex) presentation.currentSlideIndex =
parseInt(presentation.currentSlideIndex);
validateDOM(presentation);
setStatus('');

/*
 * Methods to report an error in the DOM
 */
function domWarning(aProperty, aString) {
    if (DEBUG_DOM) debugWriteln('DOM Warning (' + aProperty + '): ' +
aString);
} function domError(aProperty, aString) {
    debugWriteln('DOM Error (' + aProperty + '): ' + aString);
}

/*
 * Validate the integrity of the dom
 */
function validateDOM(aNode) {
    var myConstraints;

// Select which set of constraints we want
    if (aNode.type == PRESENTATION_CLASS) {
      myConstraints = dtd.SXPresentation;
    } else if (aNode.type == SLIDE_CLASS) {
      myConstraints = dtd.SXSlide;
    } else if (aNode.type == IMAGE_CLASS) {
      myConstraints = dtd.SXImage;
    } else if (aNode.type == TEXT_CLASS) {
      myConstraints = dtd.SXText;
    } else if (aNode.type == OUTLINE_CLASS) {
      myConstraints = dtd.SXOutline;
    } else {
      debugWriteln('DOM Error: Unrecognized type - ' + aNode.type);
      debugObject(aNode);
      return;
    }

// Check each property in the constraints
    for (var i=0; i < myConstraints.length; i++) {
      var myProperty = myConstraints[i][0];
      var myType = myConstraints[i][1];
      var myConstraint = myConstraints[i][2];
```

```
    var valType = typeof(aNode[myProperty]);
    if (valType == UNDEFINED) {
        domError(myProperty, 'Undefined property. Setting to
null.');
        aNode[myProperty] = null;
    } else {
        var myVal = aNode[myProperty];
        if (myVal == null) {
            if (myConstraint == 'required') {
                domError(myProperty, 'Required property not set');
            }
        } else {
            if (valType != myType) {
                if (myType == 'number') {
                    domWarning(myProperty,'Recasting to ' + myType);
                    aNode[myProperty] = myVal*1;
                } else if (myType == 'string') {
                    domWarning(myProperty,'Recasting to ' + myType);
                    aNode[myProperty] = myVal + '';
                } else if (myType == 'color') {
                    // PENDING(RWK) - Remove this when we no longer
have problems with
                    // colors being set to unexpected values
                    if ((myVal == UNDEFINED) ||
                        ((myVal.search(/[^0-9,a-f,A-F]/) == -1) &&
                         (myVal.length != 6))) {
                        domError(myProperty, 'Bad color value "' +
myVal + '". Setting to null.');
                        aNode[myProperty] = null;
                    } else {
                    }
                } else if (myType != 'any') {
                    domError(myProperty, 'Can\'t convert to ' +
myType);
                }
            }
        }
    }
}

// Go to the next node
if (aNode.type == PRESENTATION_CLASS) {
    myConstraints == dtd.SXPresentation;
    validateDOM(aNode.slides[0]);
} else if (aNode.type == SLIDE_CLASS) {
    if (aNode.contentEntities != null) {
        for (var myName in aNode.contentEntities) {
            validateDOM(aNode.contentEntities[myName]);
        }
    }
} else if (aNode.type == OUTLINE_CLASS) {
    // PENDING(RWK) - Check for image bullet types and turn them
    // into bullets.
    // Once we're confident there aren't any more image bullets in
    // presentations, this can check can be removed.
    if (aNode.nodeBulletType == 'image') {
        aNode.nodeBulletType = 'text-symbol';
        aNode.nodeBulletValue = 9679;
        domWarning(myProperty,'Image bullet found. (Converting to
a symbol bullet, but you should do this manually to avoid this
warning in the future.)');
```

```
        }

// Check the subnodes of this node
        if (aNode.nodes != null) {
            for (var i=0; i < aNode.nodes.length; i++) {
              validateDOM(aNode.nodes[i]);
            }
        }
    }

// Cache the urls of images that we want to preload
    if (aNode.type == IMAGE_CLASS) {
      CXUtil.preloadImage(aNode.src);
    } else if (aNode.type == OUTLINE_CLASS) {
      if (aNode.nodeBulletType == 'image') {
          CXUtil.preloadImage(aNode.nodeBulletValue);
      }
    }
}

/*
 * Resize handler to manage resizing of the slide
 */
function slideResize(anEvent) {
    if (ns4) {
        // PENDING(RWK) - NS4 workaround: Netscape massacres javascript
        // code when the window is resized.  We detect actual window size
        // changes and force a complete refresh of the document.  (The
        // downside of this is that all javascript state is lost.)
        if ((lastWidth != window.innerWidth) ||
            (lastHeight != window.innerHeight)) {
            if (slideResizeInterval) {
              clearInterval(slideResizeInterval);
              slideResizeInterval = null;
            }
            if (resizeTimeout) clearTimeout(resizeTimeout);
            window.location.href = window.location.href;
        }
    } else {
        if (!slideIsEditable) {
            if ((typeof(playbackControls) != UNDEFINED) &&
              playbackControls.isVisible()) {
              playbackControls.hide();
            }
            render();
        }
    }
    return false;
}

/*
 * This function is called whenever the address needs to be set
 */
function setAddress(myContent, myName, myParent) {
    // Set the name and address of the content object
    myContent._name = myName;
    myContent._subtype = myContent._name.replace(/[0-9]/g, '');

if (myContent.type == PRESENTATION_CLASS) {
      myContent._address = presentation.presentationID;
```

```
    } else if (myContent.type == SLIDE_CLASS) {
      myContent._address = myParent._address +
          '.slides[' + presentation.currentSlideIndex + ']';
    } else {
      myContent._address = slide._address +
          '.contentEntities[' + myContent._name + ']';
    }
}

/*
 * Call this to turn off rendering
 */
function setRenderingEnabled(aFlag) {
    // NB : this may be set in the html
    if (typeof(renderingDisableLevel) == UNDEFINED)
renderingDisableLevel = 0;
    if (aFlag && renderingDisableLevel > 0) {
        renderingDisableLevel--;
    } else {
        renderingDisableLevel++;
    }
}

/*
 * Is rendering turned off
 */
function isRenderingEnabled() {
    if (typeof(renderingDisableLevel) == UNDEFINED) {
        return true;
    }
    return (renderingDisableLevel <= 0);
}

/*
 * This function runs various setups for a new entity.
 * It is only called by newEntity().
//PENDING(HJK) this should maybe be used in slideInit and slideCache
address
 */
function setupEntity(myContent, myName, myClass, myParent) {
    myContent.type = myClass;

setAddress(myContent, myName, myParent);

if (myContent.type == OUTLINE_CLASS) initOutline(myContent);

if ((myContent.type == TEXT_CLASS) ||
       (myContent.type == IMAGE_CLASS)) {
       // Create the layer we'll need for the object
       myContent._layer = newNamedLayer(myName, slideLayer.layer);

// Create association between content and layer
       myContent._layer._content = myContent;

// Make the layer visible
       myContent._layer.show();
    }
}

//
// Size caching methods
```

```
//

/*
 * Cache the address information of DOM objects
 */
function slideCacheAddress() {
    // Initialize the presentation & slide address
    presentation._address = presentation.presentationID;
    slide._address = presentation._address +
       '.slides[' + presentation.currentSlideIndex + ']';

// Init the various slide elements
    for (var myName in slideContent) {
       var myContent = slideContent[myName];

// Set the name and address of the content object
         setAddress(myContent, myName, slide);

if (myContent.type == OUTLINE_CLASS) {
          outlineCacheAddress(myContent);
       }
    }
}

/*
 * Update any geometry we're interested in
 */
function cacheSizes() {
    // Use the slide layer width/height to find the scaling factors
    if (ns4 && slideIsEditable) {
    // PENDING(RWK) - Unfortunately on netscape the Slide layer
    // may be clipped (e.g. if the window is really small).
There's
    // know way to know what the layer size is supposed to be.
    // So, to make sure the elements are shown at the proper size
    // during editing (the only time this is really a problem)
    // we hard code the size here.
    clientWidth = 560;
    clientHeight = 420;
    } else {
    var myBounds = slideLayer.getBounds();
    clientWidth = myBounds.width;
    clientHeight = myBounds.height;
    }

/* PENDING(RWK) - Code to use the window dimensions as the slide size
    if (ns4) {
       clientWidth = window.innerWidth;
       clientHeight = window.innerHeight;
    } else {
       clientWidth = document.body.clientWidth;
       clientHeight = document.body.clientHeight;
    }
*/

// Figure the scaling factors
    xScale = clientWidth/V_WIDTH;
    yScale = clientHeight/V_HEIGHT;
    scale = (xScale < yScale) ? xScale : yScale;
    // Use this to scale based on the diagonal of the display area
```

```
    // scale = Math.sqrt(clientWidth*clientWidth +
clientHeight*clientHeight)/V_DIAG;
}

//
// Bounds retrieval methods
//

/*
 * Translate the dimensions of a layout object to real layer
coordinates
 */
function getAdjustedBounds(aContent) {
    var myBounds = new Object();

if ((aContent.left != null) &&
       (typeof(aContent.left) == 'string') &&
       (aContent.left.lastIndexOf('%') != -1)) {
       myBounds.left = parseInt(aContent.left)*clientWidth/100;
    } else {
       myBounds.left = (myBounds.left != null) ?
parseInt(aContent.left) : null;
    } if ((aContent.top != null) &&
       (typeof(aContent.top) == 'string') &&
       (aContent.top.lastIndexOf('%') != -1)) {
       myBounds.top = parseInt(aContent.top)*clientHeight/100;
    } else {
       myBounds.top = (myBounds.top != null) ? parseInt(aContent.top)
: null;
    } if ((aContent.width != null) &&
       (typeof(aContent.width) == 'string') &&
       (aContent.width.lastIndexOf('%') != -1)) {
       myBounds.width = parseInt(aContent.width)*clientWidth/100;
    } else {
       myBounds.width = (myBounds.width != null) ?
parseInt(aContent.width) : null;
    } if ((aContent.height != null) &&
       (typeof(aContent.height) == 'string') &&
       (aContent.height.lastIndexOf('%') != -1)) {
       myBounds.height = parseInt(aContent.height)*clientHeight/100;
    } else {
       myBounds.height = (myBounds.height != null) ?
parseInt(aContent.height) : null;
    } myBounds.zIndex = aContent.zIndex;

return myBounds;
}

/*
 * Return a value scaled by the generic scaling factor
 */
function adjust(aNum) {
    var myVal = aNum*scale;
```

```
    return (isNaN(myVal)) ? aNum : Math.round(myVal);
}

/*
 * Return a value scaled by the width scaling factor
 */
function adjustX(aNum) {
    if (typeof(aNum) != 'number') return aNum;
    return Math.round(aNum*xScale);
}

/*
 * Return a value scaled by the height scaling factor
 */
function adjustY(aNum) {
    if (typeof(aNum) != 'number') return aNum;
    return Math.round(aNum*yScale);
}

//
// Rendering methods
//

/*
 * Render all the layers named in the content object
 */
function render() {
    // Get the client screen size
    cacheSizes();

if (!isRenderingEnabled()) return;

// Set the clipping region of the slide layer
    //
    // PENDING(RWK) - NS4 workaround: Without this clip, NS4
    // clips the slide to approximatlely 1/2 it's width
    slideLayer.setClipRect(0, 0, clientWidth, clientHeight);

// Render each content element
    for (var myName in slideContent) {
      setStatus('Rendering (' + myName + ')');
      renderContent(myName);
    }
}

/*
 * Need this on netscape so we can fix the display (not doneyet)
 */
function hasTransparentImages() {
    for (var myName in slideContent) {
        var myContent = slideContent[myName];
            if (myContent.type == IMAGE_CLASS &&
                myContent.backgroundColor == null) {
                return true;
        }
    }
    return false;
}

/*
 * Write the contents associated with a layer
```

```
*/
function renderContent(aName, isMove) { if (!isRenderingEnabled()) return;

// PENDING(RWK) - Minor hack to make sure we render an entire outline, even
    // if we're passed the name of one of the subnodes
    // (Also note that the regex is not supposed to be a string! Very wierd.)
    aName = aName.replace(/:.*/g, '');

// Get references to the properties
    var myContent = slideContent[aName];

// Get the adjusted bounds (as a separate object so that if the window
    // is resized, we still have the original specification to recompute
    // from.)
    var myBounds = getAdjustedBounds(myContent);

// Get the layer the content will be rendered into
    var myLayer = myContent._layer;

// For easy content...
    if (myContent.type != OUTLINE_CLASS) {
      // Error check for missing layer
      if (!myLayer) {
          warning('Unable to locate layer "' + aName + '"');
          return;
      }

// Explicitly set the layer index.
      myLayer.style.zIndex = myBounds.zIndex;

// Set the layer position
      myLayer.setOrigin(myBounds.left, myBounds.top);
        if (!isMove) {
            myLayer.setSize(myBounds.width, myBounds.height);

// Set the default alignments
            myLayer.setAlign('center');
            myLayer.setVerticalAlign('middle');

if (ns4) {
                // Netscape does not understand 0 dimension, it reads this as unbounded
                if (!myBounds.width || myBounds.width <= 0) myBounds.width = 1;
                if (!myBounds.height || myBounds.height <= 0) myBounds.height = 1;
            }
            // Call the appropriate renderer, based on type
            if (aName == BACKGROUND_NAME) {
                renderBackground(myLayer, myContent, myBounds);
            } else if (myContent.type == TEXT_CLASS) {
                renderText(myLayer, myContent, myBounds);
            } else if (myContent.type == IMAGE_CLASS) {
                renderImage(myLayer, myContent, myBounds);
            }
```

```
                    // Flush what we've written to the layer
                    myLayer.flush();
                }
        } else {
            // Special case for outline
            renderOutline(myLayer, myContent, myBounds, (!isMove) ? false : true);
        }
}

/*
 * All hyperlinks come through this method, to apply rules to URLs,
 and display.
 *
 * URL munging:
 * any string with an "@" w/o a protocol is assimed to be a mailto:
 * any plain number is assumed to be a slideNUMBER (as distinct from
 a slideID)
 * any string starting with "?" are assumed to be a link to another
 presentation on this host
 * any string (other than the ones above) w/o a protocol get
 "http://" added to them.
 *
 * Display:
 * any iamaze URL is shown in this window
 * all ther windows appear in a separate window
 */
function startLinkTag(aURL) {
    var myLink = null;
    var myTarget = 'target="user_link"';

if (slideIsEditable) {
        myLink = '<u>';
    } else {
      if (aURL.indexOf(':') == -1) {
          if (aURL.indexOf('@') != -1) {
            aURL = "mailto:" + aURL;
          } else {
            var myNumber = parseInt(aURL);
            // if the url is a number, treat as a slideNumber (origin
1)
            if (!isNaN(myNumber) && (myNumber + '') == myNumber) {
              . // Force number into proper range
                if (myNumber < 1) {
                   myNumber = 1;
                } else if (myNumber >
presentation.slideTitles.length) {
                   myNumber = presentation.slideTitles.length;
                }
                aURL = '?' +
                   'presentationID=' + presentationID() + '&' +
                   'slideID=' + (myNumber - 1);
          } else if (!aURL.startsWith('?')) {
              // Prefix with http:// for URLs that don't specify a
protocol
              aURL = "http:\/\/" + aURL;
          }
        }
    }

// Handle ? syntax for specifying the arguments to a
```

```
            // presentation w/o supplying a host
            if (aURL.startsWith('?')) aURL = getBase() + aURL;

// Put all internal URLs in same window
            if (aURL.startsWith(getBase()) || (aURL.indexOf("iamaze")
!= -1)) myTarget = null;
        } if ((!myTarget) || aURL.startsWith("mailto:")) {
            myLink = '<a href="' + aURL + '">';
        } else {
            myLink = '<a href="' + aURL + '" ' + myTarget + '>';
        }
    } return myLink;
}

/*
 * end of a link tag (handled differently on play vs edit).
 */
function endLinkTag() {
    return (!slideIsEditable ? '</a>' : '</u>');
}

/*
 * Replace special tokens in the text
 */
var slideTokens = [
    /\%SlideNumber%/g, (presentation.currentSlideIndex + 1),
    /\%SlideCount%/g, presentation.slideCount,
    null
];
function replaceSlideTokens(aString) {
    for (var i = 0; slideTokens[i] != null; i += 2) {
        aString = aString.replace(slideTokens[i], slideTokens[i+1]);
    } return aString;
}

/*
 * Write text content
 *
 * aLayer: the layer to write the text into
 * aContent: an object containing any combination of the following
properties
 *     align         - One of "left", "center", or "right"
 *     color         - Either a named color or a color in the form
'RRGGBB'
 *     fontFamily    - A comma separated list of font names
 *     fontSize      - A number (not a string!) specifying the font
point size
 *     fontStyle     - Either null or 'italic'
 *     fontWeight    - Either null or 'bold'
 *     text          - Arbitrary text string
 *     url           - A valid URL
 *     verticalAlign - One of "top", "middle", or "bottom"
 */
function renderText(aLayer, aContent, aBounds) {
    // Check for nothing worth rendering during playback
```

```
    if (((!aContent.text) && (!aContent.backgroundColor) &&
(!slideIsEditable)) return;

// PENDING(RWK) - Really ugly workaround to make sure we don't
lose the
    // style information when rendering to the layer
    if (ns4) aLayer.doLayerHack();

// Set the layer color and alignment
    aLayer.setBackgroundColor(aContent.backgroundColor);
    aLayer.setAlign((aContent.align != null) ? aContent.align :
'left');
    aLayer.setVerticalAlign((aContent.verticalAlign != null) ?
      aContent.verticalAlign : 'top');

// Figure out what text we want
    var myText = aContent.text;

// Do token replacement for slide numbers
    if (aContent._subtype == 'SlideNumber') {
      myText = replaceSlideTokens(myText);
    }

// PENDING(RWK) - IE workaround: There is a wierd problem with
line
    // spacing in multiple lines of text. We fix this by simply
ensuring
    // that the last character is a space. (Don't ask me why this
works,
    // but it does)
    if (ie4 && myText && (myText.indexOf('\n') != -1) &&
myText[myText.length-1] != ' ')
       myText += ' ';

// Use default text if we're editing and the text is empty
    if (slideIsEditable && (!myText)) myText = DEFAULT_DIRECTIONS + '
' +
        DEFAULT_TEXT_STRING + ' ' + aContent.name;

// Render the content
    if (myText) {
      // Write the url start tag
      if (aContent.url) {
         aLayer.write(startLinkTag(aContent.url));
      }

// Write the text
      writeTextStyle(aLayer, aContent);
      aLayer.write(myText.escapeForHTML());
      aLayer.writeln('</font>');

// Write the url end tag
      if (aContent.url) aLayer.write(endLinkTag());
    }
}

/*
 * Write style information for text content
 */
function writeTextStyle(aLayer, aContent) {
    var style = '';
```

```
        if (aContent.fontSize != null) style += ' font-size:' +
adjust(aContent.fontSize) + 'pt';
        if (aContent.fontFamily != null) style += '; font-family:' +
aContent.fontFamily;
        if (aContent.fontStyle != null) style += '; font-style:' +
aContent.fontStyle;
        if (aContent.fontWeight != null) style += '; font-weight:' +
aContent.fontWeight;
        if (aContent.color != null) style += '; color:' +
aContent.color;
        aLayer.write('<font style="' + style + '">');
}

/*
 * Write background content
 */
function renderBackground(aLayer, aContent, aBounds) {
    aBounds.left = aBounds.top = 0;
    aBounds.width = clientWidth;
    aBounds.height = clientHeight;
    renderImage(aLayer, aContent, aBounds);
    aLayer.setOrigin(0,0);
    aLayer.setSize(clientWidth,clientHeight);
    return;
}

/*
 * Write image content
 *
 * aLayer: the layer to write the text into
 * aContent: an object containing any combination of the following
properties
 *      align       - One of "left", "center", or "right"
 *      src         - A URL specifying the source of the image
 *      scale       -   'fit' scales the image. Everything else is
unscaled.
 *      file        - If the file was uploaded, the filename where
the image came from
 *      verticalAlign - One of "top", "middle", or "bottom"
 * aBounds: The bounds of the image area
 */
function renderImage(aLayer, aContent, aBounds) {
    // Set the background color
    aLayer.setBackgroundColor(aContent.backgroundColor);

// Write the empty content string?
    if ((aContent.src == null) &&
        (aContent.backgroundColor == null)) {
        if (slideIsEditable && (aContent._name != BACKGROUND_NAME))
            aLayer.write(DEFAULT_DIRECTIONS + ' ' +
DEFAULT_IMAGE_STRING + ' ' + aContent.name);
        return;
    }

// Get a cleaned up version of the image source URL
    var mySrc = aContent.src;
    if (mySrc && (mySrc.indexOf(':') == -1) &&
        !mySrc.startsWith('/') && !mySrc.startsWith('\\')) {
        // PENDING(RWK) - Note that we are a little stricter with the
source
        // URL since it may be an iAmaze server image reference
```

```
      mySrc = 'http:\/\/' + mySrc;
  }

// Defer rendering the image?
  if ((mySrc != null) && (deferImageContent(aContent, mySrc)))
return;

// Write out the href link
  if (aContent.url != null && !slideIsEditable) {
    aLayer.write(startLinkTag(aContent.url));
  }

// Write a shim image?
  var myScale = aContent.scale;
  if ((!mySrc) || (myScale == SCALE_TILE)) {
    // Write the shim image to size the layer properly
    aLayer.write('<img src="' + SHIM_IMAGE + '"' +
        ' width=' + aBounds.width + ' height=' + aBounds.height +
        ' hspace=0 vspace=0 border=0>');
  }

// Render the image
  if (mySrc) {
    if (myScale == SCALE_TILE) {
        // Set the image as the layer background
        aLayer.setBackground(mySrc);
    } else {
        // Use the shim image to make sure the table will be as
small as needed
        if (mySrc == null) {
          mySrc = SHIM_IMAGE;
          myScale = SCALE_FIT;
        } aLayer.write('<img src="' + mySrc + '"');
        if (myScale == SCALE_FIT) {
          aLayer.write(' width=' + aBounds.width + ' height=' +
aBounds.height);
        } else if (myScale == SCALE_WIDTH) {
          aLayer.write(' width=' + aBounds.width);
        } else if (myScale == SCALE_HEIGHT) {
          aLayer.write(' height=' + aBounds.height);
        }
        // When editing on netscape, name the image and catch the
onload (see imageLoaded)
        if (ns4 && slideIsEditable) {
            aLayer.write(' name="' + IMAGE_NAME_PREFIX +
aLayer.name +
              '" onload="imageLoaded(this)" ');
        }
        aLayer.write(' hspace=0 vspace=0 border=0>');

// And make sure any previous tiling is removed
        aLayer.setBackground(null);
    }
  } else if (aLayer.getBackground()) {
    aLayer.setBackground(null);
  }

// Close out the href
  if ((aContent.url != null) && !slideIsEditable) {
```

```
    aLayer.write(endLinkTag());
  } if (aContent.align != null) aLayer.setAlign(aContent.align);
  if (aContent.verticalAlign != null)
     aLayer.setVerticalAlign(aContent.verticalAlign);
}

// PENDING(RWK) - Buttugly IE5 workaround:  The image onload event
appears to get sent before the slide is actually ready (the complete
flag is still false and the image fails to render.)  Instead of
relying on the event, we set up an interval to poll the images at
reasonable intervals. Ugly, ugly, ugly!
var deferredInterval = null;

/*
 * PENDING(RWK) - IE5 workaround (part 1 of 2): Images that load in
 * a delayed fashion are not rendered.
 *
 * Return true if we have to wait for an image to load, false
 * if the image is already loaded.
 *
 * For images that are not loaded, add the image to our load queue
 * and set up an onload handler to check the queue when the image
 * loaded.
 */
var deferredContent = new Array();
function deferImageContent(aContent, aSrc) {
// PENDING(RWK) - I'm turning this off for a while to see how well
things behave.  If things continue to work, then we might consider
deleting this code.
return false;
    if ((!ie4) || (version < 5)) return false;

// Create and configure only if the image doesn't already exist
    if (!aContent._image) {
       aContent._image = new Image(1,1);
       aContent._image.src = aSrc;

// Defer the image if it's not loaded
       if (!aContent._image.complete) {
          deferredContent.addObject(aContent);
          if (!deferredInterval) {
             deferredInterval = setInterval('deferredImageCheck()',
333);
          }
       }
    } return (aContent._image.complete) ? false : true;
}

/*
 * PENDING(RWK) - IE5 workaround (part 2 of 2): Images that load in
 * a delayed fashion are not rendered.
 *
 * This method is called any time one of our deferred images becomes
loaded.
 * Determine which content the image was for, and render that
content.
 */
```

```
function deferredImageCheck(aString) {
    for (var i = deferredContent.length-1; i >= 0; i--) {
      var myContent = deferredContent[i];

if (myContent._image.complete) {
          // Turn off the handler since animated images will keep
calling
          // the handler, and remove the content.

// myContent._image.onload = null;
          deferredContent.removeIndex(i);

// Render the content
          renderContent(myContent._name);
      }
    }

// Turn off the timer if there are no deferred images
    if ((deferredContent.length == 0) && (deferredInterval)) {
      clearInterval(deferredInterval);
      deferredInterval = null;
    }
}

/*
 * Convenience method to determine if the mouse position of
 * anEvent is within the slide
 */
function isEventOnSlide(anEvent) {
    var myBoundsLayer = slideLayer ;
    return myBoundsLayer.isHit(anEvent);
}

/*
 * Convenience method to determine if a location
 * is within the slide
 */
function isPointOnSlide(aLeft, aTop) {
    var myBoundsLayer = slideLayer ;
    // Cache the bounds, it never changes, and this method is called
    // a LOT, so we don't want to alloc a bounds each time
    if (myBoundsLayer.myCachedBounds == null)
        myBoundsLayer.myCachedBounds =
myBoundsLayer.getAbsoluteBounds();
    var mb = myBoundsLayer.myCachedBounds;
    if (aLeft >= mb.left && aLeft <= (mb.left + mb.width) &&
        aTop >= mb.top && aTop <= (mb.top + mb.height))
        return true;
    return false;
}

/*
 * Accessor for presentationID, for use in URLs
 */
function presentationID() {
    var pid = presentation.presentationID;
    if (pid.startsWith('com.')) {
        myStart = pid.indexOf('_');
        if (myStart > 0) pid = pid.substring(myStart+1);
    }
    return pid;
```

```
}
/*
 * Accessor for formatted titles of slides (used in UI slide
choosers)
 */
function formattedSlideTitle(index, maxChars, minChars, padChar) {
    if (index < 0 || index >= presentation.slideTitles.length)
        return 'Unknown slide index' + index;

var sTitle = (index+1) + '. ' + presentation.slideTitles[index];
    var newln = sTitle.indexOf('\n');
    if (newln > 0) {
        sTitle = sTitle.substring(0, newln - 1);
        if ((sTitle.length + 3) < maxChars)
            sTitle += '...';
    }
    return sTitle.insureLength(maxChars, minChars, padChar);
}

/*
 * Is this content entity the background
 */
function isBackground(aContent) {
    if (aContent == null || aContent._name == null) return false;
    return (aContent._name == BACKGROUND_NAME);
}

/*
 * Returns the object of the highest number with the passed
objectName
 */
function slideLastObject(objectName) {
    // The new entity code makes sure that the numbers are
contiguous,
    // so look fo the first gap.
    if (slideContent[objectName + '1']) {
        var biggest = 1;
        for (var myName in slideContent) {
            if (myName.startsWith(objectName)) {
                var myIndex =
parseInt(myName.substr(objectName.length));
                if (myIndex > biggest) biggest = myIndex;
            }
        }
        return objectName + biggest;
    }
    return null;
}

/*
 * This is called whenever any image content is finished loading
 * Workaround for a bug where handlers were not set properly
 * on large images (Netscape)
 */
function imageLoaded(anImage) {
    if (ns4 && anImage && anImage.name) { setRolloversToCurrentState(getNamedLayer(anImage.name.substr(IMAGE_NA
ME_PREFIX.length)));
        command.safeToSend();
```

```
        }
    }

//
// CXElementIterator class
//
// This class iterates through the elements of a slide
// aFilter - A function that accepts an element as it's only
// parameter and returns true for it to be included, false to
// exclude it.
// function CXElementIterator(aSlide, aFilter) {
    this.filter = (aFilter) ? aFilter : CXElementIterator.ALL;
    this._elements = new Array();
    this.nextElementIndex = 0;
    for (var myName in aSlide.contentEntities) {
       this._addElementToIterator(aSlide.contentEntities[myName]);
    }
}

CXElementIterator.prototype = new CXIterator();

CXElementIterator.ALL = function(anElement) {return true;}

CXElementIterator.prototype._addElementToIterator =
function(anElement) {
    if (anElement && this.filter(anElement)) {
       this._elements[this._elements.length] = anElement;
       if (anElement.nodes) {
            for (var i = 0; i < anElement.nodes.length; i++)
               this._addElementToIterator(anElement.nodes[i]);
       }
    }
}

CXElementIterator.prototype.hasNext = function() {
    return (this.nextElementIndex < this._elements.length);
}

CXElementIterator.prototype.next = function() {
    return this._elements[this.nextElementIndex++];
}
```

Table 11. JavaScript that interprets the document data structure for an outline

```
function CXOutline() {};

CXOutline.version = 1;
CXOutline.name = 'Outline';

CXSystem.registerLibrary(CXOutline);
/************************/

//
// Global vars
```

```
//
// Default text to show when a node has no text
var DEFAULT_OUTLINE_STRING = 'Empty outline item';

// Constants for the type of bullet
var BULLET_TEXT =           'text';
var BULLET_IMAGE =          'image';
// RWK - It's important for these to start with the BULLET_TEXT
// string since we do startsWith() comparisons on them.
var BULLET_SYMBOL =         'text-symbol';
var BULLET_LETTER_LOWER =   'text-letter-lower';
var BULLET_LETTER_UPPER =   'text-letter-upper';
var BULLET_NUMBER_PLAIN =   'text-number-plain';
var BULLET_NUMBER_NESTED =  'text-number-nested';
var BULLET_ROMAN_LOWER =    'text-roman-lower';
var BULLET_ROMAN_UPPER =    'text-roman-upper';

// Common symbol bullet characters
var SYMBOL_DASH = 8211;
var SYMBOL_DOT = 8226;

/*
 * Initialize an outline
 */
function initOutline(aNode) {
    // Init the layers array for outline nodes
    aNode._nodeLayers = new Array();

// Init the root node and all subnodes
    aNode._parentNode = null;
    aNode._rootNode = aNode;
    aNode._level = 0;
    if ((aNode.nodes != null) && (aNode.nodes.length > 0)) {
      outlineInitNode(aNode);
      outlineCacheAddress(aNode);
    } else if (slideIsEditable) {
      // If the root node has no nodes, create a placeholder
      // so the user has something to click on when editing.
      var newNode = new Object();
      aNode.nodes = new Array();
      aNode.nodes.addObject(newNode);
      aNode.nodeBulletType = BULLET_SYMBOL;
      aNode.nodeBulletValue = SYMBOL_DOT;

outlineInitNode(aNode);
      outlineCacheAddress(aNode);

// Set the address to null to mark this as a placeholder node
      newNode._address = null;
    }
    // make the height match the nodes
    aNode._rootNode.dirtyHeight = true;
}

/*
 * Recursively initialize outline nodes.
 *
 * - Set the type of each node to OUTLINE_CLASS
 * - Set the root node of each node.
 * - Set the parent of each node.
```

```
 * - Enumerate through the nodes of an outline and name the node
after
 * it's node location.
 */
function outlineInitNode(aNode) {
    // Error check
    if (aNode.nodes == null) return;

// Enumerate through each node
    for (var i = 0; i < aNode.nodes.length; i++) {
      var myNode = aNode.nodes[i];
      myNode.type = OUTLINE_CLASS;
      myNode._name = aNode._name + ':' + i;
      myNode._parentNode = aNode;
      myNode._rootNode = aNode._rootNode;
      myNode._level = aNode._level + 1;
      myNode._subtype = aNode._subtype;
      if ((myNode.nodes != null) && (myNode.nodes.length > 0)) {
          // If we didn't just create one, than initialize the node
          outlineInitNode(myNode);
      }
    }
}

/*
 * Cache the address of each outline node
 */
function outlineCacheAddress(aNode) {
    // Error check
    if (aNode.nodes == null) return;

// Enumerate through each node
    for (var i = 0; i < aNode.nodes.length; i++) {
      var myNode = aNode.nodes[i];
      myNode._address = aNode._address + '.nodes[' + i + ']';
      if ((myNode.nodes != null) && (myNode.nodes.length > 0)) {
          // If we didn't just create one, than initialize the node
          outlineCacheAddress(myNode);
      }
    }
}

//
// Outline rendering
//

/*
 * Write outline content
 *
 * Outlines are implemented by rendering each node in it's own layer.
 * For convenience, the layers are stored in the '_nodeLayers' array
within
 * the root node, which is initialized in the initSlide() method.
 */
function renderOutline(aLayer, aContent, aBounds, isMove) {
    // Set up some default properties
    aContent.verticalSpacing = 8;
    aContent.indentSpacing = 45;
    aContent.heightInPixels = 0; // (we'll total this up)

// Create the render context and init it
```

```
    var myContext = new Object();

// Set the origin and available width
    myContext.left = aBounds.left;
    myContext.top = aBounds.top;
    myContext.width = aBounds.width;
    myContext.zIndex = aBounds.zIndex;
    myContext.indentSpacing = aContent.indentSpacing;
    myContext.verticalSpacing = aContent.verticalSpacing;

// Set the layers information
    myContext.nextLayerIndex = 0;

// Set the properties
    myContext.nodeBulletPrefix = null;
    myContext.nextBulletValue = 1;

// Set the effects information
    myContext.effectStartTime = 0;

// Error check - Just return if there're no nodes
    // PENDING(RWK) - Hmm.  'Not 100% sure why I put this here.
    if (aContent.nodes == null) return;

// Render the nodes
    renderOutlineNodes(aContent, myContext, (!isMove) ? false :
true);

// Hide any unused layers
    while (myContext.nextLayerIndex < aContent._nodeLayers.length) {
      aContent._nodeLayers[myContext.nextLayerIndex++].hide();
    } if (slideIsEditable) {
        if (ns4) setRolloverEvents(true);
        if (aContent.dirtyHeight != false) {
           aContent.height =
              Math.round(((aContent.heightInPixels/
              (slideLayer.getAbsoluteBounds()).height) *
100).toString()
              + "%";
           aContent.dirtyHeight = false;
        }
    }
}

/*
 * Create an outline node
 */
function renderOutlineNodes(anOutline, aContext, isMove) {
    var myLayers = anOutline._rootNode._nodeLayers;

// Enumerate through the node list
    for (var i = 0; i < anOutline.nodes.length; i++) {
      var myNode = anOutline.nodes[i];
      var myLayer = null;

// Create a new layer if needed
      if (aContext.nextLayerIndex >= myLayers.length) {
          myLayer = newNamedLayer(
             anOutline._name + '-' + myLayers.length,
```

```
            slideLayer.layer);
        myLayers.addObject(myLayer);

// Turn off wrapInTable (we create our own table) and set
        // the alignment
        myLayer.setWrapInTable(false);
        myLayer.setVerticalAlign('top');
    } else {
        // Recycle an existing layer
        myLayer = myLayers[aContext.nextLayerIndex];

// PENDING(RWK) - Really ugly workaround to make sure we don't lose the
        // style information when rendering to the layer
        if (ns4 && (!isMove)) myLayer.doLayerHack();
    }

// Set the association between content and layer
    //
    // We do this here for outlines rather than in initSlide()
    // because, unlike other elements, nodes may switch layers
    // (this happens if a node is added, deleted, or moved during
    // editing).
    myLayer._content = myNode;
    myNode._layer = myLayer;

// Set the bounds - Make the height tiny so the content will push
    // the layer to the proper height.
    myLayer.setSize(aContext.width, 0);
    myLayer.setOrigin(aContext.left, aContext.top);

if ((!isMove)) { //PENDING(HJK) weird indenting for diffs
        // Set the background color of the layer
        myLayer.setBackgroundColor(myNode.backgroundColor);

// Write the table tag for the layer
        myLayer.write(myLayer.tableTag());
        myLayer.write('<tr>');

// Write the outline node
        var myType = myNode.nodeBulletType;
        var myPadding = null;

// Write out the bullet cell
        if (myType != null) {
            // Render the bullet cell
            myLayer.write('<td valign="top" width="1px">');

if (myType.startsWith(BULLET_TEXT)) {
                var myText = null;
                // Write the text style
                writeTextStyle(myLayer, myNode);

// Determine the prefix string
                var myPadding = '. ';
                var myValue = (myNode.nodeBulletValue == null) ?
                    aContext.nextBulletValue :
                    myNode.nodeBulletValue;
                if (myType == BULLET_SYMBOL) {
                    myText = '&#' + myValue + ';';
```

```
                myPadding = '  ';
            } else if (myType == BULLET_LETTER_LOWER) {
                myText = toLetter(myValue, false);
            } else if (myType == BULLET_LETTER_UPPER) {
                myText = toLetter(myValue, true);
            } else if (myType == BULLET_NUMBER_PLAIN) {
                myText = myValue;
            } else if (myType == BULLET_NUMBER_NESTED) {
                myText = (aContext.nodeBulletPrefix != null)
                    ? (aContext.nodeBulletPrefix + '.' +
                        myValue) :
                        myValue;
            } else if (myType == BULLET_ROMAN_LOWER) {
                myText = toRoman(myValue, false);
            } else if (myType == BULLET_ROMAN_UPPER) {
                myText = toRoman(myValue, true);
            } else {
                warning('Unrecognized bullet type: ' +
                    myType);
            } myLayer.write(myText);
            myLayer.write('</font>');

aContext.nextBulletValue = myValue + 1;
        } else if (myType == BULLET_IMAGE) {
// PENDING(RWK) - Remove this block once all outlines have had
the image bullets removed
            var myValue = myNode.nodeBulletValue;
            if (myNode.fontSize != null) {
                myLayer.write('<img height=' +
                    adjust(myNode.fontSize*.8) + 'px'
                    + ' src="' + myValue +
                    '">   ');
            } else {
                myLayer.write('<img src="' + myValue + '">');
            }
            aContext.nextBulletValue = 1;
// PENDING(RWK) - End of block to remove
        } myLayer.write('</td>');
    } else {
        aContext.nextBulletValue = 1;
    }

// Write out the padding cell
    if (myPadding) {
        myLayer.write('<td valign="top" width="1px">');
        writeTextStyle(myLayer, myNode);
        myLayer.write(myPadding);
        myLayer.write('</font></td>');
    }

// Use default text if we're editing and the text is
empty
    var myText = myNode.text;
    if (slideIsEditable && (!myText)) myText =
DEFAULT_OUTLINE_STRING;
```

```
        // Write out the text cell
        myLayer.write('<td valign="top" width="99%">');
        if (myText) {
            // Write the url start tag
            if (myNode.url) {
                myLayer.write(startLinkTag(myNode.url));
            }

// Write the text
            writeTextStyle(myLayer, myNode);
            myLayer.write(myText.escapeForHTML());
            myLayer.write('</font>');

// Write the url end tag
            if (myNode.url) myLayer.write(endLinkTag());
        }

// Close up
        myLayer.write(myLayer.tableCloseTags());
        myLayer.flush();

// Show the layer and offset the context by the size of the layer
        myLayer.style.zIndex = aContext.zIndex;
        myLayer.show();
    }

// Prepare the context for the next node
    aContext.top += myLayer.getHeight() +
adjust(aContext.verticalSpacing);
    anOutline._rootNode.heightInPixels += myLayer.getHeight() +
adjust(aContext.verticalSpacing);
    aContext.nextLayerIndex++;

// Render any subnodes
    if ((myNode.nodes != null) && (myNode.nodes.length > 0)) {
        // Store the context
        var subContext = objectCopy(aContext);
        subContext.nextBulletValue = 1;
        subContext.nodeBulletPrefix = myText;

// Configure the context for the subnodes
        var myIndent = adjust(subContext.indentSpacing);
        subContext.left += myIndent;
        subContext.width -= myIndent;
        if (myNode.nodeBulletType != null) {
            subContext.nodeBulletType = myNode.nodeBulletType;
        }
        if (myNode.indentSpacing != null)
            subContext.indentSpacing = myNode.indentSpacing;
        if (myNode.verticalSpacing != null)
            subContext.verticalSpacing = myNode.indentSpacing;

// Render the subnodes
        renderOutlineNodes(myNode, subContext, isMove);

// Get interesting stuff from the subContext
        aContext.nextLayerIndex = subContext.nextLayerIndex;
        //aContext.effectStartTime = subContext.effectStartTime;
        aContext.top = subContext.top;
    }
```

```
    }
}
/*
 * Utility for finding the firstnode, given any node
 */
function firstNode(aNode) {
    if (aNode == null || aNode._rootNode == null)
        return null;
    return aNode._rootNode.nodes[0];
}

//
// Bulleting conversion utilities
//

/*
 * Convert a number to it's roman numeral equivalent
 * PENDING(RWK) - This method probably wants to live somewhere else
 */
var romanData = [[1000,-1000,'M'],[900,100,'C'],[500,-
500,'D'],[400,100,'C'],[100,-100,'C'],[90,10,'X'],[50,-
50,'L'],[40,10,'X'],[10,-10,'X'],[9,1,'I'],[5,-5,'V'],[4,1,'I'],[1,-
1,'I']];
function toRoman(aVal, isUppercase) {
    var romanString = '';
    while (aVal > 0) {
      for (var i = 0; i < romanData.length; i++) {
          if (aVal >= romanData[i][0]) {
             aVal += romanData[i][1];
             romanString += romanData[i][2];
             break;
          }
      }
    }
    return isUppercase ? romanString : romanString.toLowerCase();
} function toLetter(aVal, isUppercase) {
    return String.fromCharCode((isUppercase ? 64 : 96) + (((aVal-1) %
26) + 1));
}
```

Table 12. Java code for creating the JavaScript data structure of a document.

```
package com.andgit.util;

import java.util.Collection;
import java.util.Iterator;
import java.util.Map;

/**
 * This class helps to create JavaScript from other data structures.
 */
public class SXJavaScript {
```

```
//
// STATIC METHODS
//

/**
 * Puts a backslash ("\") character in front of all characters that
 * need to be "escaped" in JavaScript strings, so that they are not
 * interpreted specially by the JavaScript interpreter.
 *
 * Currently that set of characters is:
 * \ -> \\
 * ' -> \'
 * backspace -> \b
 * form-feed -> \f
 * newline -> \n
 * Carriage return -> \r
 * tab -> \t
 */
static public String escapeSpecialCharacters(String baseString) {
    // NOTE: Adding this method did not seem to effect our
    // pages-per-second timing, so I don't think it's a problem.
    // If it does show up as a problem in future performance tests,
    // however, it can be implemented differently (e.g. with lookup
    // tables), though it will be harder to read/debug/add to.

// \ -> \\
    baseString = SXString.replaceSubstring(baseString, "\\", "\\\\");
    //·We now need to "escape" all quote ("'") characters and
    // some other characters, according to the JavaScript spec.
    // ' -> \'
    baseString = SXString.replaceSubstring(baseString, "'", "\\'");
    // backspace -> \b
    baseString = SXString.replaceSubstring(baseString, "\b", "\\b");
    // form-feed -> \f
    baseString = SXString.replaceSubstring(baseString, "\f", "\\f");
    // newline -> \n
    baseString = SXString.replaceSubstring(baseString, "\n", "\\n");
    // Carriage return -> \r
    baseString = SXString.replaceSubstring(baseString, "\r", "\\r");
    // tab -> \t
    baseString = SXString.replaceSubstring(baseString, "\t", "\\t");

return baseString;
}

/**
 * Takes in a table of key/value pairs representing attribute names and
 * attribute values.
 * The "keys" in this table must be of type String.
 * The "values" may be of type:
```

```
 *
 *         String, Integer, Collection, or "null"
 *
 * - If the "value" is of type "Collection", it should be a Collection
 * of SXContentEntity type objects, so that it will generate the
 * appropriate textual description when its "toString()" method gets called.
 * Collections will be translated into a JavaScript array.
 *
 * - If the "value" is of type Integer, and the value of the Integer is
 * "-1", the value "null" (without quotes) will be written to the JavaScript.
 *
 * If objectToRepresent is a Map, and there is a key in the named "name", then
 * its value will be used to label that block of data, so given:
 * name = "Outline1", and key value pairs for width, height, top
 * and left, produces the following JavaScript output:
 *
 * Outline1:{
 *      width:92,
 *      height:18,
 *      top:4,
 *      left:4
 * }
 *
 * If "quoteNumericValues" is "true", then the output will look like this:
 * Outline1:{
 *      width:"92",
 *      height:"18",
 *      top:"4",
 *      left:"4"
 * }
 * NOTE, however, that if numeric values aren't quoted, then string
 * fields which have only numeric values, such as "Title" (on SXText)
 * field with a value of "3", will be sent down unquoted, which then
 * causes JavaScript errors.
 * Nevertheless, this means that some values, like "slideID" will be
 * sent down quoted, and will be interpretted as strings during
 * arithmetic operations on the client, e.g. "+".
 * The client, therefore, should validate what
 * it *knows* to be numeric fields, and re-assign them the numeric
 * value of their string. This is the lesser of two evils (the server
 * "knowing" about types, vs. the client knowing about types).
 * This whole dilemma is one of the few
 * drawbacks of our "typeless" system.
 * (the typing knowledge <b>could</b> actually be done on the server-side
 * via the classmaps, which SXPersistentPropertyHolder already knows
 * about, but the client needs to do field-by-field validation
 * anyway, for debugging purposes, so we might as well let the
```

```
 * client validate/massage their DOM)
 *
 * NOTE, also, that if the "value" associated with a key in a Map
 * or Collection is not of type "String", or is "null",
 * the value will <b>not</b> be quoted, regardless of the value
of
 * "quoteNumericValues".
 *
 * There will <B>not</B> be a final carriage-return after the
final
 * closing bracket (}).
 */
    static public SXIndentedStringBuffer
getJavaScriptRepresentationOfData(SXIndentedStringBuffer
indentBuffer, Object objectToRepresent, boolean quoteNumericValues) {
        if (objectToRepresent != null) {
            Object aValue = null;
            boolean objectIsMap = objectToRepresent instanceof Map;
            boolean objectIsCollection = !objectIsMap &&
objectToRepresent instanceof Collection;

// SOME KIND OF "DATA CONTAINER"... ITERATE OVER IT AND
CALL BACK RECURSIVELY.
            if (objectIsMap || objectIsCollection) {
                String containerEncloserStartCharacter = null;
                String containerEncloserEndCharacter = null;
                Iterator anIterator;
                boolean hasMoreElements;
                boolean firstTime = true;

// DO THIS STUFF ONCE, BEFORE PROCESSING THE CONTAINER
ELEMENTS
                if (objectIsMap) {
                    anIterator =
((Map)objectToRepresent).keySet().iterator();
                    containerEncloserStartCharacter = "{";
                    containerEncloserEndCharacter = "}";
                } else {
                    anIterator =
((Collection)objectToRepresent).iterator();
                    containerEncloserStartCharacter = "[";
                    containerEncloserEndCharacter = "]";
                }
                indentBuffer.println(containerEncloserStartCharacter);
                indentBuffer.indent();

hasMoreElements = anIterator.hasNext();
                while (hasMoreElements) {
                    // DO THIS STUFF FOR EACH CONTAINER ELEMENT
                    if (!firstTime) {
                        indentBuffer.println(","); // Put a comma after the
item prior to us
                    } else {
                        firstTime = false;
                    }
                    if (objectIsMap) {
                        String aKey = (String)(anIterator.next());

indentBuffer.print(aKey);
                        aValue = ((Map)objectToRepresent).get(aKey);
                        indentBuffer.print(":");
```

```
            } else {
                // We must be a Collection...
                aValue = anIterator.next();
            }
            // Now, let's call this method recursively on
"value"...

SXJavaScript.getJavaScriptRepresentationOfData(indentBuffer, aValue,
quoteNumericValues);
            hasMoreElements = anIterator.hasNext();
        }
            // DO THIS STUFF ONCE, AFTER PROCESSING THE CONTAINER
ELEMENTS
            indentBuffer.outdent();
            indentBuffer.println("");
            indentBuffer.print(containerEncloserEndCharacter);

// SXJavaScriptProducer... LET IT RE-CALL US WITH THE
HASHMAP IT WANTS SAVED
        } else if (objectToRepresent instanceof
SXJavaScriptProducer) {

((SXJavaScriptProducer)objectToRepresent).getJavaScriptRepresentation
(indentBuffer);
            // FLAT, LEAF-NODE VALUE... JUST WRITE IT OUT...
        } else {
            boolean objectIsInteger = false; // PENDING(kbern): see
below
            boolean objectIsString = objectToRepresent instanceof
String;
            boolean quoteThisValue = true;//PENDING(kbern) was false;
see below /******
            PENDING(kbern): converting to number is no longer
            desirable?  Note that this causes problems with
strings
            that are integers AND have leading zeros, e.g. the
            RGB color 002233 becomes 2233.

if (objectIsString) {
                try {
                    objectToRepresent = new
Integer((String)objectToRepresent);
                } catch (NumberFormatException anException) {
                    // Quote non-numeric Strings if they're not empty
(though
                    // that case is caught in the previous "else if"
clause).
                    quoteThisValue = true;
                }
            }
            *******/ objectIsInteger = objectToRepresent instanceof Integer;

if (objectIsInteger) {
                if (((Integer)objectToRepresent).intValue() == -1) {
                    aValue = "null";
                }
                if (quoteNumericValues) {
```

```
                quoteThisValue = true;
            }
        } else if (objectToRepresent instanceof Boolean) {
            quoteThisValue = false; // booleans are never quoted!
        }
        String objectToRepresentString =
objectToRepresent.toString();
        if (quoteThisValue) {
            indentBuffer.print("'");
            objectToRepresentString =
SXJavaScript.escapeSpecialCharacters(objectToRepresentString);
        }
        indentBuffer.print(objectToRepresentString);
        if (quoteThisValue) {
            indentBuffer.print("'");
        }
    }
} else {
    indentBuffer.print("null");
}
return indentBuffer;
    }
}
```

It is assumed that the content of a browser's web page is HTML. However, this needs not be true since more advanced browsers are capable of displaying other formats, most notably, eXtensible Markup Language (XML). Therefore, the process described herein also fits other browser document formats and thus the HTML format is actually not a requirement for the process.

Although the invention is described herein with reference to the preferred embodiment, one skilled in the art will readily appreciate that other applications may be substituted for those set forth herein without departing from the spirit and scope of the invention.

Accordingly, the invention should only be limited by the Claims included below.

The invention claimed is:

1. A system, tangibly stored on a computer-readable medium, for delivering and rendering scalable Web pages said system comprising:
   a browser;
   a script, which is associated with an interpretation code; and
   a document object model;
   wherein said script, when executed, creates a data structure that describes an entire web document created by a page author;
   wherein said data structure comprises:
      a root object;
      wherein said root object comprises an array of slides and each said slide is an object representing a single slide in a presentation; and
      wherein each said slide comprises a plurality of content entities and each said content entity has a variety of properties;
   wherein said content entities comprise:
      a text entity;
      an outline entity; and
      an image entity; wherein each said content entity comprises:
   a plurality of attributes which collectively define the rectangle occupied by each said content entity;
   an attribute to store each said content entity;
   an attribute to indicate the name of each said content entity; and
   an attribute to indicate the z-ordering of the layer entities in said slide; and
      wherein said interpretation code interprets, said data structure in a fashion that allows said data structure to manipulate said document object model for the purpose of rendering said entire web document to said browser.

2. The system of claim 1, wherein said browser may be any kind of Web browser that supports a scripting language with a means of modifying the contents of the displayed Web pages.

3. The system of claim 1, wherein said data structure can be optimized to include only the essential information of said entire web document.

4. The system of claim 1, wherein said data structure and said interpretation code may be contained in a single file.

5. The system of claim 1, wherein said data structure may be separated out from said interpretation code.

6. The system of claim 1, wherein said root object further comprises:
   an array of strings that contains the titles of each said slide in said presentation.

7. The system of claim 1, wherein said root object further comprises:
   a first attribute, which is an index of the current slide in said presentation; a second attribute, which Is true for sample presentations;
   a third attribute, which is true for style presentations;
   a fourth attribute, which is true for template presentations;
   a fifth attribute, which indicates the database ID of said presentation;
   a sixth attribute, which indicates the total number of slides in said presentation; and
   a seventh attribute, which indicates the type to which said object belongs.

8. The system of claim 1, wherein each said slide further comprises:
   a first attribute, which indicates the type of effect to use when showing said slide;
   a second attribute, which indicates the name of the layout that said presentation is based on;
   a third attribute, which is a set of user supplied notes for said slide;
   a fourth attribute, which indicates the title of said slide; and
   a fifth attribute, which indicates the type to which said slide belongs.

9. The system of claim 8, wherein said first attribute comprises:
   a first value, which is a set of slide elements to slide in from the right;
   a second value, which is a set of slide elements to slide in from the left;
   a third value, which is a set of slide elements to slide in from the bottom;
   a fourth value, which is a set of slide elements to indicate slide in from the top;
   a fifth value, which is a set of slide elements to flash briefly; and
   a sixth value, which is a set of slide elements that reveals progressively on each mouse crick.

10. The system of claim 1, wherein said text entity further comprises:
    an attribute to define font point size;
    an attribute to define font style;
    an attribute to define font family;
    an attribute to define font weight;
    an attribute to define text color;
    an attribute to define background color;
    an attribute to define horizontal alignment;
    an attribute to define vertical alignment; and
    an attribute to define URL to navigate.

11. The system of claim 1, wherein said outline entity inherits all the attributes of said text entity and further comprises:
    an attribute to define the type of bullet;
    an attribute to define the value specifying how said bullet should look like; and
    an attribute to define an array of sub-outlines.

12. The system of claim 1, wherein said image entity further comprises:
    an attribute to define horizontal alignment;
    an attribute to define background color;
    an attribute to define the scaling mode to use when displaying said image;
    an attribute to define URL of the image to display;
    an attribute to define URL to navigate; and
    an attribute to define vertical alignment.

13. The system of claim 12, wherein said attribute to define the scaling mode to use when displaying said image comprises:

a fit value, with which said image is scaled to fit exactly within the bounds of said slide;

a width value, with which said image is scaled, retaining the aspect ratio, so that the width of said image fits exactly in the bounds of said slide;

a height value, with which said image is scaled, retaining the aspect ratio, so that the height of said image fits exactly in the bounds of said slide; and a tile value, with which said image is tiled at said image's native size to exactly fill the image bounds.

14. The system of claim 12, wherein said image entity comprises a background element, and wherein said background element always keeps its bounds corresponding to the bounds of said slide.

15. The system of claim 14, wherein said background element always maintains its z-index at zero.

16. A computer-implemented method for delivering and rendering scalable Web pages said method comprises the steps of:

creating, by executing a script, a data structure that describes an entire web document;

interpreting, by an interpretation code, said data structure in a fashion that allows said data structure to manipulate a document object model for the purpose of rendering said entire web document to a browser;

wherein said data structure comprises:

a root object;

wherein said root object comprises an array of slides and each said slide is an object representing a single slide in a presentation; and wherein each said slide comprises a plurality of content entities and each said content entity has a variety of properties;

wherein said content entities comprise:

a text entity:

an outline entity; and an image entity: wherein each said content entity comprises:

a plurality of attributes which collectively define the rectangle occupied by each said content entity;

an attribute to store each said content entity;

an attribute to indicate the name of each said content entity; and an attribute to indicate the z-ordering of the layer entities in said slide;

wherein said entire web document is automatically updated to reflect changes to said browser whenever said browser is resized.

17. The method of claim 16, wherein said data structure can be optimized to include only the essential information of said entire web document.

18. The method of claim 16, wherein said data structure and said interpretation code may be contained in a single file.

19. The method of claim 16, wherein said data structure may be separated out from said interpretation code.

* * * * *

UNITED STATES PATENT AND TRADEMARK OFFICE
CERTIFICATE OF CORRECTION

| | | |
|---|---|---|
| PATENT NO. | : 7,412,644 B2 | Page 1 of 1 |
| APPLICATION NO. | : 10/203044 | |
| DATED | : August 12, 2008 | |
| INVENTOR(S) | : Robert Kieffer et al. | |

It is certified that error appears in the above-identified patent and that said Letters Patent is hereby corrected as shown below:

Title page,
Add Section -- (60) RELATED U.S. APPLICATION DATA:

Provisional Application No. 60/180,439, filed on Feb. 4, 2000. --

Signed and Sealed this

Thirtieth Day of September, 2008

JON W. DUDAS
*Director of the United States Patent and Trademark Office*